US012533905B1

(12) United States Patent
Smith et al.

(10) Patent No.: US 12,533,905 B1
(45) Date of Patent: Jan. 27, 2026

(54) DIRECT THERMAL PRINTABLE MEDIA WITH SIDE CHAIN CRYSTALLINE POLYMER MATERIAL COATING

(71) Applicant: Zebra Technologies Corporation, Lincolnshire, IL (US)

(72) Inventors: Marielle K. Smith, Parlin, NJ (US); Mohannad Abdo, Clifton, NJ (US); Brian S. Huffman, Belle Mead, NJ (US); Sakhi K. Shah, Livingston, NJ (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 0 days.

(21) Appl. No.: 18/958,742

(22) Filed: Nov. 25, 2024

(51) Int. Cl.

| | |
|---|---|
| ***B41M 5/42*** | (2006.01) |
| ***B41M 5/41*** | (2006.01) |
| ***B41M 5/46*** | (2006.01) |

(52) U.S. Cl.
CPC ................ *B41M 5/42* (2013.01); *B41M 5/41* (2013.01); *B41M 5/465* (2013.01); *B41M 2205/04* (2013.01); *B41M 2205/28* (2013.01); *B41M 2205/32* (2013.01); *B41M 2205/34* (2013.01); *B41M 2205/36* (2013.01)

(58) Field of Classification Search
CPC .......... B41M 5/42; B41M 5/41; B41M 5/465; B41M 2205/04; B41M 2205/28; B41M 2205/32; B41M 2205/34; B41M 2205/36
USPC ........................................................ 428/32.39
See application file for complete search history.

(56) References Cited

U.S. PATENT DOCUMENTS

| | | | | |
|---|---|---|---|---|
| 4,428,321 | A | 1/1984 | Arens | |
| 6,060,427 | A | 5/2000 | Mori et al. | |
| 10,022,942 | B2 | 7/2018 | Brown et al. | |
| 11,131,656 | B2 | 9/2021 | Prusik et al. | |
| 11,225,100 | B2 | 1/2022 | Ribi | |
| 2009/0239746 | A1 | 9/2009 | Aihara | |
| 2014/0044609 | A1 * | 2/2014 | Prusik | G01K 11/06 422/429 |
| 2014/0144366 | A1 | 5/2014 | Huffman et al. | |
| 2022/0112391 | A1 * | 4/2022 | Smith | G09F 3/0297 |
| 2022/0283041 | A1 | 9/2022 | Olson et al. | |
| 2024/0278592 | A1 * | 8/2024 | Stalling | B41M 5/44 |

FOREIGN PATENT DOCUMENTS

| | | |
|---|---|---|
| JP | S63-27587 | 2/1988 |
| JP | H10-193794 | 7/1998 |
| JP | 2000-158822 | 6/2000 |
| WO | WO 2014/153446 A1 | 9/2014 |

OTHER PUBLICATIONS

Data sheet titled Stearyl Acrylate by Osaka Organic Chemical Industry Ltd., Year 2020.

* cited by examiner

*Primary Examiner* — Betelhem Shewareged
(74) *Attorney, Agent, or Firm* — K&L Gates LLP

(57) ABSTRACT

Direct thermal print media comprising side chain crystalline material are disclosed. The print media are substantially free of bis-phenols, and can retain color when subjected to light and/or temperatures ranging from, for example, −15° C. to 45° C. for long durations.

31 Claims, 14 Drawing Sheets

| Ottopol 25-30 in SCC Emulsion<br>OD Cyan Values on 2A Leneta (Opacity after drying at room temp) Black background | | | | | | |
|---|---|---|---|---|---|---|
| Control without Ottopol 25-30 | 44% SCC (solids) P/B 10.0 | 39% SCC (solids) P/B 5.0 | 36% SCC (solids) P/B 3.5 | 32% SCC (solids) P/B 2.5 | 29% SCC (solids) P/B 2.0 | 24% SCC (solids) P/B 1.0 |
| 0.135 | 0.178 | 0.169 | 0.278 | 0.407 | 1.384 | 1.458 |
| 0.131 | 0.172 | 0.24 | 0.241 | 0.503 | 1.484 | 1.498 |
| 0.144 | 0.198 | 0.221 | 0.278 | 0.498 | 1.573 | 1.526 |
| 0.153 | 0.189 | 0.219 | 0.282 | 0.483 | 1.477 | 1.477 |
| 0.143 | 0.184 | 0.212 | 0.298 | 0.473 | 1.58 | 1.490 |

| Topcoat Layer | None | Water-based Clear Topcoat (F10DTTCOZD1) | Water-based Clear Topcoat (F10DTTCOZD1) | Water-based Clear Topcoat (F10DTTCOZD1) | Water-based Clear Topcoat (F10DTTCOZD1) With Paraffin/Carnauba wax | Water-based Clear Topcoat (Thermotak AQ) |
|---|---|---|---|---|---|---|
| Opaque Layer (Wet Film Thickness) | 50C SCC in Ottopol 25-30 (1.5 mil) | 50C SCC in Ottopol 25-30 (1.5 mil) | 50C SCC in Ottopol 25-30 (1.5 mil) | 50C SCC in Ottopol 25-30 (1.5 mil) | 50C SCC in Ottopol 25-30 (1.5 mil) | 50C SCC in Ottopol 25-30 (1.5 mil) |
| Pre-Printed Base Layer | 5200 Black Resin TTR on PolyPro 4000T | | Silver Wax/Resin TTR on PolyPro 4000T | 5% NeoBlack in Ottopol 25-30 (12.0 BCM, Flexo) on PolyPro 4000T | 5% NeoBlack in Ottopol 25-30 (12.0 BCM, Flexo) on Z-Xtreme 4000T | |
| OD Cyan Before DT Printing | 0.154 | 0.183 | 0.104 | 0.198 | 0.195 | 0.185 |
| OD Cyan After DT Printing | 1.878 | 1.357 | 0.391 | 0.919 | 1.345 | 1.060 |
| DT Imaged Substrate | 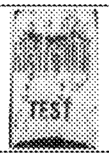  | 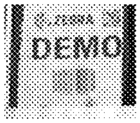  | 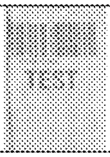 | 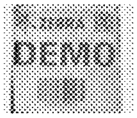  | 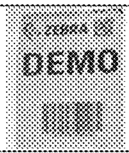  | 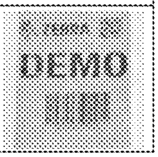  |

FIG. 10

DIRECT THERMAL PRINTABLE MEDIA WITH SIDE CHAIN CRYSTALLINE POLYMER MATERIAL COATING

BACKGROUND

Direct thermal printing employs heat-sensitive media to produce images by selectively heating the thermal media, usually on a pixel by pixel or line by line basis. The heating creates a color change, most commonly light to dark, which thereby creates text, graphics, or images. Heat exposure from a direct thermal printer activates the chemicals in or on the media, causing a color change and generating the desired print.

SUMMARY

In an embodiment, provided is a thermal printable media, comprising: a transparent or translucent substrate; a heat-sensitive layer on a first surface of the substrate comprising: a heat-sensitive polymer; and a binder adhering the heat-sensitive polymer to the first surface; a pigmented adhesive layer on a second surface of the substrate; and a removable release liner in contact with the pigmented adhesive layer; wherein, in response to heat exposure above a predetermined threshold temperature applied at selected locations on the printable media, the heat-sensitive layer changes irreversibly to transparent or translucent at the selected locations, thereby revealing the pigmented adhesive's color at the selected locations.

In some embodiments, the second surface is opposite the first surface.

In some embodiments, the heat-sensitive polymer is selected from a side chain crystalline (SCC) polymer, or a side chain liquid crystal polymer (SCLCP).

In some embodiments, the heat-sensitive layer changing irreversibly to transparent or translucent at the selected locations is a result of a change in crystallinity of the heat-sensitive polymer.

In some embodiments, the heat-sensitive layer coats between about 80% to about 100% of the first surface of the substrate.

In some embodiments, the heat-sensitive layer has an optical transparency, prior to the heat exposure, sufficient to mask the pigmented adhesive. In some embodiments, the heat-sensitive layer has an optical transparency of about 2% to about 5% prior to the heat exposure, and an optical transparency of about 90% to about 95% after the heat exposure.

In some embodiments, the pigmented adhesive coats between about 80% to about 100% of the second surface of the substrate.

In some embodiments, the pigmented adhesive comprises a water-based ink. In a variation of this embodiment, the pigmented adhesive comprises carbon black in an amount sufficient to allow a dark color to be visible at the selected locations through the transparent or translucent substrate and the heat-sensitive layer after the heat-sensitive layer changes to transparent or translucent at the selected locations.

In some embodiments, the pigmented adhesive comprises about 1% to about 25% of pigment by weight of pigmented adhesive.

In some embodiments, the transparent or translucent substrate comprises polyethylene terephthalate (PET), biaxially oriented polypropylene (BOPP), cast polypropylene (CPP), polyethylene (PE), polypropylene (PP), ethylene vinyl acetate (EVA) or ethylene vinyl alcohol (EVOH), or a combination thereof. In a variation of this embodiment, the transparent or translucent substrate is a polymer film. In some embodiments, the polymeric film comprises PET or BOPP.

In some embodiments, the heat-sensitive polymer is an SCC polymer.

In some embodiments, the SCC polymer has a melting temperature ($T_m$) ranging from about 40° C. to about 300° C. In some embodiments, the SCC polymer has a melting temperature ($T_m$) ranging from about 40° C. to about 100° C.

In some embodiments, the SCC polymer is about 20% to about 50% weight by weight (w/w) of the coat on the substrate.

In some embodiments, the SCC polymer and the binder are mixed in water in a ratio ranging from about 10:1 to about 1:10 and coated on the substrate.

In some embodiments, the SCC polymer is an acrylate. In some embodiments, the SCC polymer is a polyalkyl acrylate comprising a plurality of $C_{16}$-$C_{30}$ alkyl sidechains. In some embodiments, the SCC polymer has a number average molecular weight of about 60,000 daltons to about 120,000 daltons.

In some embodiments, the binder comprises an anionic acrylate. In some embodiments, the binder comprises a hydroxyalkyl acrylate.

In some embodiments, the thermal print media described herein may further comprise a varnish overcoat overlaid on the heat-sensitive layer. In some embodiments, the varnish overcoat comprises a water based acrylic emulsion. In some embodiments, the varnish overcoat is a clear topcoat. In some embodiments, the varnish overcoat further comprises paraffin and/or carnauba wax.

In some embodiments, the thermal printed media described herein durably retains its color for a period of at least 1 year when subjected to light (e.g., UV light) and/or temperatures ranging from −15° C. to 45° C. In some embodiments, the thermal printed media described herein durably retains its color for a period of at least 3 months, 6 months, 1 year, or 2 years, when subjected to light (e.g., UV light) and/or temperatures ranging from −15° C. to 45° C., or from −30° C. to about 55° C.

In an embodiment is a method for preparing the thermal print media described herein, the method comprising: receiving a substrate; coating a heat-sensitive layer comprising a heat-sensitive polymer and a binder on between about 80% to about 100% of a first surface of the substrate; coating a pigmented adhesive on between about 80% to about 100% of a second surface of the substrate, opposite the first surface; placing a removable releasable liner in contact with the pigmented adhesive; and optionally overlaying a varnish overcoat on the heat-sensitive layer.

In some embodiments, the method further comprises contacting the printable media with a direct thermal print head to provide a printed media.

In some embodiments, the method further comprises removing the liner and applying the printed media to a surface.

In an additional embodiment is a thermal printable media, comprising: a substrate; a pigmented layer on a first surface of the substrate; a heat-sensitive layer overlaying the pigmented layer comprising: a heat-sensitive polymer; and a binder adhering the heat-sensitive polymer to the pigmented layer; an adhesive on a second surface of the substrate, opposite the first surface; and a removable release liner in contact with the adhesive; wherein, in response to heat exposure above a predetermined threshold temperature applied at selected locations on the printable media, the heat-sensitive layer changes irreversibly to transparent or translucent at the selected locations, thereby revealing the pigmented layer's color at the selected locations; wherein the heat-sensitive layer changes irreversibly to transparent or translucent at the selected locations in a temperature range of about 65° C. to about 150° C.; wherein the heat-sensitive polymer comprises a polyalkyl acrylate prepared from a plurality of monomers having sidechains ranging in length from $C_{16}$ to $C_{30}$; wherein the heat-sensitive polymer has a number average molecular weight of about 60,000 daltons to about 120,000 daltons; and wherein the heat-sensitive layer coats between about 80% to about 100% of the surface of the pigmented layer.

In an additional embodiment is a thermal printable media, comprising: a substrate; a heat-sensitive layer overlaying a first surface of the substrate comprising: a heat-sensitive polymer; a binder adhering the heat-sensitive polymer to the first surface; and a pigment; an adhesive layer on a second surface of the substrate, opposite the first surface; and a release liner in contact the adhesive; wherein, in response to heat exposure above a predetermined threshold temperature applied at selected locations on the printable media, the heat-sensitive layer changes irreversibly to transparent or translucent at the selected locations, thereby revealing the pigment's color at the selected locations; wherein the heat-sensitive layer changes irreversibly to transparent or translucent at the selected locations in a temperature range of about 65° C. to about 150° C.; wherein the heat-sensitive polymer comprises a polyalkyl acrylate prepared from a plurality of monomers having sidechains ranging in length from $C_{16}$ to $C_{30}$; wherein the heat-sensitive polymer has a number average molecular weight of about 60,000 daltons to about 120,000 daltons; and wherein the heat-sensitive layer coats between about 80% to about 100% of the substrate.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed devices, methods and apparatuses, and explain various principles and advantages of those embodiments.

FIG. 10 illustrates results from using a varnish, according to embodiments of the present disclosure.

Figure 1:
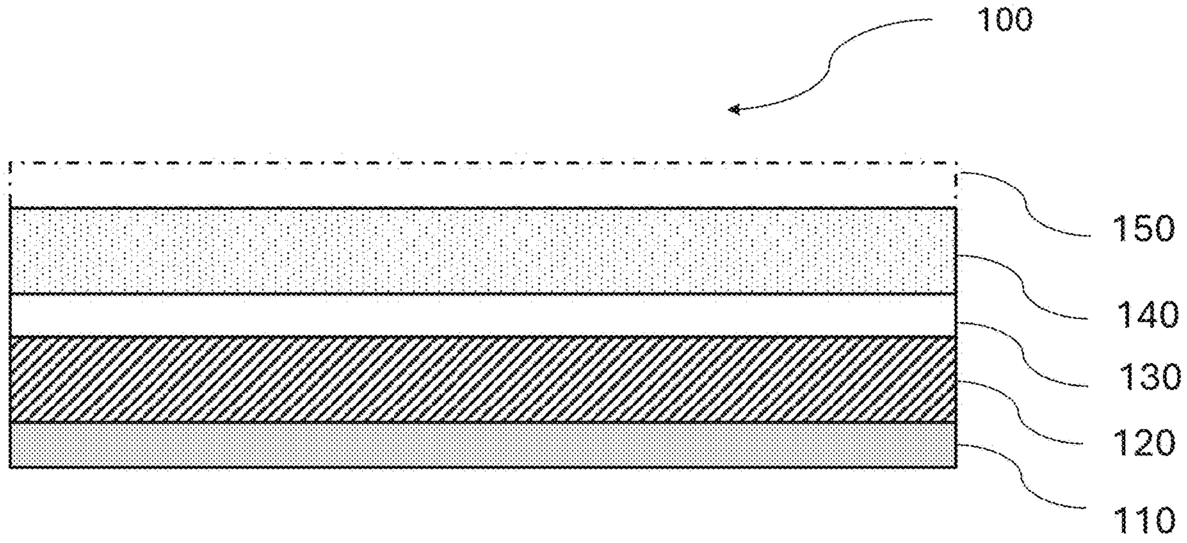
FIG. 1 illustrates a first configuration of a thermal printable media according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the description with details that will be readily apparent to those of ordinary skill in the art having the benefit of the description herein.

DETAILED DESCRIPTION

Direct thermal printing eliminates the need for ink, toner, or ribbons, reducing environmentally harmful waste. However, currently used direct thermal printing substrates incorporate thermochromic color developers which include, for example, environmentally harmful bis-phenols. By contrast, the print media described herein utilize water-based pigments incorporated in an adhesive layer and do not include harmful bis-phenols.

Another problem with many common thermal print media is that the printing produced by the thermal print process fades after a period of time, making the printed media unreadable. The thermal print media herein are robust and retain the printed images or text for longer periods of time compared to many common thermal print media.

The thermal print media described herein include an opaque heat-sensitive layer overlaid on a transparent or translucent substrate. Further, the thermal print media herein include a pigmented layer initially obscured by the opaque heat-sensitive layer. This pigmented layer, may in some cases be formed by a pigment mixed into the adhesive on an opposite surface of the transparent or translucent substrate. When specific portions of the thermal print media described herein are heated with a thermal printer (e.g., in the shape of images or alphanumeric characters), the heat from the printhead melts the heat-sensitive layer in the heated areas, changing it irreversibly from opaque to transparent or translucent, revealing the pigmented adhesive's color which is then visible through the transparent or translucent substrate and the heat-sensitive layer. Thus, the print media described herein have a different layered structure compared to currently used thermal print media.

Because the color change is not happening in the pigmented layer, pigments that are long lasting and resistant to extreme environmental effects may be chosen. Similarly, the opaque layer may also maintain it transparency or translucency more or less indefinitely, and when exposed to elevated temperatures, and certainly for a far longer period than conventional thermal print media will hold their color.

Also, conventional thermal print media may turn color over time when exposed to sunlight or elevated temperature, reducing the expected readability life of a conventional thermally printed label. Some example embodiments of this disclosure show much superior readability life, including when exposed to sunlight or elevated temperatures, e.g., in a vehicle passenger compartment.

Definitions

All numerical designations, e.g., volume, mass, etc. are approximations which are varied by (+) or (−) by increments of 1.0 or 0.1, as appropriate. It is to be understood, although not always explicitly stated, that all numerical designations are preceded by the term "about."

As used here, the singular form "a", "an" and "the" include plural reference unless the context clearly dictates otherwise.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5% of the number, parameter, or characteristic so qualified, which would be understood as appropriate by a skilled artisan to the scientific context in which the term is utilized.

As used herein, the terms "comprising", "comprises" and "comprise" are intended to mean that the compositions, preparations and/or methods disclosed herein include recited elements, but do not exclude others.

"Number average molecular weight" ($M_n$) is the statistical average molecular weight of all the polymer chains in the sample, and is defined by $$Mn = \frac{\sum N_i M_i}{\sum N_i}$$

where $M_i$ is the molecular weight of a chain and $N_i$ is the number of chains of that molecular weight. $M_n$ can be predicted by polymerization mechanisms and is measured by methods that determine the number of molecules in a sample of a given weight.

"Optical transparency" refers to the ratio of transmitted luminous flux to incident luminous flux and is a measure of transmittance of light through the heat-sensitive polymer.

"Pigments" are finely ground solid particles that provide color and opacity to ink. Generally, pigments comprise colored, black, white, or fluorescent organic or inorganic solids that cannot dissolve in, or be affected by the substrate or vehicle they are incorporated into.

"Heat-sensitive layer" and "heat-sensitive polymer" refers to materials that, up on exposure to a threshold temperature, undergo a physical change (e.g., melt) and thereby change in optical transparency.

As used herein, the heat-sensitive layer changing "irreversibly" to transparent or translucent at the selected locations means that after a heat-sensitive polymer in the heat-sensitive layer has undergone a change in optical transparency during direct thermal printing, the heat-sensitive polymer does not change back to the initial optical transparency for the duration of time (e.g., from about 1 month to about 2 years or more) that the printed media is in use, or under conditions such as temperatures and/or incident light that the printed media would be generally exposed to, i.e., the heat-sensitive layer has changed irreversibly to transparent or translucent at the selected locations.

In a particular embodiment, the thermal print media herein include a transparent or translucent substrate which is overlaid with a heat-sensitive layer on a first surface. For example, about 80% to about 100%, or about 50% to about 80% of the first surface of the substrate is overlaid by a heat-sensitive layer. In some embodiments, about 100% of the first surface of the substrate is overlaid by a heat-sensitive layer. In a particular embodiment, the thermal print media herein include a transparent or translucent substrate overlaid with a pigmented adhesive on a second surface, opposite the first surface, where the first surface has been overlaid with a heat-sensitive layer. For example, about 80% to about 100%, or about 50% to about 80% of the second surface of the substrate is coated by a pigmented adhesive. In some embodiments, about 100% of the second surface of the substrate is overlaid by a pigmented adhesive.

In some embodiments herein, a heat-sensitive polymer is a homopolymer, or is a mixture of copolymers, and is a reaction product of a plurality of monomers having alkyl side chains optionally functionalized with hydroxy, ester, amide, N-alkyl amino, N,N-dialkyl amino, or ether groups. In some embodiments, the alkyl side chains range in length from $C_{16}$ alkyl to $C_{30}$ alkyl from $C_{16}$ alkyl to $C_{28}$ alkyl, from $C_{16}$ alkyl to $C_{26}$ alkyl, or from $C_{16}$ alkyl to $C_{24}$ alkyl.

The side chains in the heat-sensitive polymer are selected to form crystalline regions and may comprise, for example, $—(CH_2)_n—$ and/or $—((CH_2)_m—O—)$ n groups. The side chains are preferably linear to facilitate crystallization. For heat-sensitive polymers that contain $—(CH_2)_n—$ groups in the crystallizable side chain, n is may be in the range of about 6 to about 35, or about 16 to about 30. For heat-sensitive polymers that contain $—((CH_2)_m—O—)$ n groups in the crystallizable side chain, m may be in the range of about 1 to about 35, or about 10 to about 30. In some embodiments, m and n are selected and the spacing between side chains and the length and type of side chain are selected to provide a heat-sensitive polymer with a desired melting point.

The spacing between side chains and the length and type of the side chains are selected to provide the heat-sensitive polymer with a melting point in the range of about 40° C. to about 100° C. As the spacing between side chains increases, the tendency for the side chains to be crystallizable tends to decrease. As the flexibility of the side chains increases, the tendency for the side chains to be crystallizable tends to decrease. As the length of the side chains increases, the tendency for the side chains to be crystallizable tends to increase. In some embodiments, the length of the crystallizable side chain may be in the range of about two times to about ten times the average distance between crystallizable side chains in the heat-sensitive polymer. Examples of heat-sensitive polymers include and are not limited to poly (1-alkene) s, poly(alkyl acrylate) s, poly(alkyl methacrylate) s, poly(alkyl vinyl ether) s, and/or poly(alkyl styrene) s, or any combination thereof.

The thermal print media herein are printable at different temperatures ranging from about 40° C. to about 110° C., from about 40° C. to about 100° C., from about 40° C. to about 80° C., or from about 40° C. to about 65° C., and the temperature at which the heat-sensitive polymer melts is tunable depending on the selection of the length of the alkyl side chains. For example, an acrylate homopolymer comprising $C_{26}$ alkyl side chains may provide a melt temperature of about 80° C. for the heat-sensitive polymer, an acrylate homopolymer comprising $C_{30}$ alkyl side chains may provide a melt temperature of about 80° C. for the heat-sensitive polymer.

The ability to overlay a substrate with a heat-sensitive layer also depends on the viscosity of the polymeric emulsion used for coating the substrate. The viscosity of a polymeric emulsion comprising a heat-sensitive polymer may range from about 500 cps to about 3500 cps. The emulsion may comprise water, isopropyl alcohol, n-propanol, 2-(2-butoxyethoxy) ethanol, an ether (e.g., ethylene glycol monobutyl ether, diethylene glycol monobutyl ether), or any combination thereof.

The heat-sensitive polymer's melt temperature ($T_m$) is variably configurable by selecting a suitable number average molecular weight the heat-sensitive polymers and by selecting a suitable side chain length. In some embodiments, the number average molecular weight for a heat-sensitive polymer used for the thermal print media herein ranges from about 60,000 to about 120,000 daltons, or from about 80,000 to about 100,000 daltons. Thus, the thermal print media herein can develop color at different temperatures, allowing for compatibility with a plurality of printers and print settings, ideally without suffering decreases in print quality.

In some examples the proportion (by weight) of the heat-sensitive polymer in the coating overlaid on the transparent or translucent substrate is about 20%, about 25%, about 30%, about 35%, about 40%, about 45%, about 50%, about 55%, about 60%, about 65%, about 70%, or about 75%. In some embodiments, about 20% to about 75% weight, about 20% to about 50% weight, or about 25% to about 60% weight by weight (w/w) of the coating overlaid on the transparent or translucent substrate is comprised of the heat-sensitive polymer and provides an optical transparency that can mask the pigmented adhesive (e.g., an optical transparency of about 1% to about 10%). In some embodiments, the heat-sensitive layer is substantially free of additives selected from cavitation agents, beta-nucleating agents, crystallizable solvents, or color formers. Without being bound by any theory, it is believed that the heat-sensitive polymers used herein undergo an irreversible change in crystallinity, whereby the print areas are rendered transparent or translucent (e.g., optical transparency of about 80% to about 100%), thereby revealing the print area in color.

Figure 7:
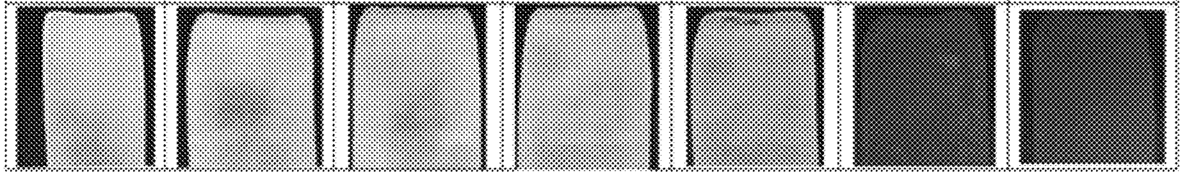
FIG. 7 illustrates results from Example 1, according to embodiments of the present disclosure.

The heat-sensitive polymer is prepared as an emulsion in a suitable solvent and added to a mixture of a binder in water to provide the final coating solution which is overlaid on the substrate. In some embodiments, the binder is a hydroxyalkyl acrylate in an aqueous emulsion. Other binders may be used such as acrylic dispersions, acrylic emulsions, water-reducible epoxy esters, and styrene acrylic emulsions. The ratio of the heat-sensitive polymer to binder is variably configured to provide low initial optical transparency. FIG. 7 provides some examples of changes in polymer:binder (P/B) ratios and effects on optical transparency of the heat-sensitive layer. In some embodiments, the P/B ratio ranges from about 1:10 to about 10:1. In some embodiments, the P/B ratio is 10, 5, 3.5, 2.5, 2.0, or 1. In some embodiments, the binder is about 25% to about 30% by weight in an emulsion or solution, for example an acrylate (e.g., hydroxyalkyl acrylate) in water. The optical transparency of the heat-sensitive layer is initially from about 1% to about 10%, and after thermal printing, the optical transparency of the heat-sensitive layer is about 90% to about 100%.

The weight percent of solids in the mixture used for overlaying the substrate (i.e., heat-sensitive polymer emulsion and binder mixture) may be in an amount that allows for a continuous thin film to be formed, overlaying at least about 80% of the substrate. If the weight percent of solids in the mixture used for overlaying the substrate is too high, the flood coating may be flaky, resulting in uneven deposition of the heat-sensitive layer on the substrate, affecting the direct thermal image/print quality. In some embodiments, the weight percent of solids in the mixture used for overlaying the substrate ranges from about 30% to about 50%, or from about 40% to about 45% by weight of the mixture comprising a heat-sensitive polymer, a binder, and solvents). After the heat-sensitive layer is overlaid on the substrate, the substrate is dried, thereby removing most of the solvents.

Additional components may be included in the heat-sensitive polymer and binder mixture which is overlaid on a substrate such as surfactants/wetting agents, humectants (e.g., polyethylene glycol), thickening agents, and/or defoamers.

While the heat-sensitive polymers have been described above in the context of side-chain crystalline polymers, also contemplated herein are side chain liquid crystal polymers (SCLCPs) which can be tuned to desired melt temperatures and used in the thermal print media described herein.

Inclusion of a pigment (e.g., a water-based pigment) in a layer which is initially obscured by the heat sensitive layer advantageously avoids the use of thermochromic inks which have been used in thermal print media previously and can include bis-phenols. Thus, in some embodiments, the present thermal print media are free of environmentally harmful bis-phenols. Non-limiting examples of water-based pigments include carbon black, Neo colors by Matsui, plant-derived pigments, or metal based pigments. The pigment loading in the adhesive ranges from about 1% to about 25%, about 1% to about 20%, or about 2% to about 10% by weight of the pigmented adhesive. While a separate layer might be employed (as disclosed in more detail later), advantageously, the pigmented layer may be provided by including the pigment in a label adhesive layer applied to the face of the transparent substrate opposite the face which has the heat sensitive layer. The adhesive may be a pressure sensitive adhesive, e.g., an acrylic adhesive. The pigment is mixed in an aqueous solution of the adhesive (e.g., an acrylic adhesive). Other examples of adhesives include and are not limited to acrylic copolymers, polyisobutylene rubber, silicone, styrenic block copolymers, acrylic/vinyl acetate copolymers, and polyurethane/acrylic copolymers. Examples of commercially available adhesives include Butofan® NS 166 (aqueous polymer dispersion of styrene/butadiene copolymer), Acronal® DS 3598 NA (acrylic copolymer dispersion), Robond® PS-7735 and PS-68HV (water-based acrylic), Rhoplex® N-619 (acrylic emulsion), Alberdingk® AC 75025 VP (acrylic polymer emulsion), Alberdingk® AC 7514 (dispersion of acrylic acid ester copolymer), Alberdingk® AC 75013 (polyurethane and acrylate dispersion), Covinax® 289-01 DEV (acrylic copolymer), and Covinax® 386-07 (vinyl modified acrylic copolymer). The pigment may be surface treated, or pre-dispersed in water (with surfactants/stabilizers and/or combined with polymeric dispersion additive or binder resin) to reduce agglomeration, and then mixed into an aqueous solution of the adhesive. Examples of commercially available black pigments include NeoBlack® (Matsui)—aqueous carbon black concentrate, non-resinous, AquaBlack® 5106 (Chromascape)—resin free, surfactant based, AquaBlack® 8386 (Chromascape)—modified acrylic resin, low surfactant, Raven® 900 (Birla Carbon)—surface modified powder, BlackShield® 11B760 (DyStar)—non-resinous aqueous dispersion, and BlackShield® 11B701 (DyStar)—acrylic resin, aqueous dispersion.

The adhesive layer is in contact with a removable backing (a release liner) which may be removed during or after printing. In some embodiments, the pigmented adhesive comprises carbon black in an acrylate. In some embodiments, the pigmented adhesive comprises Neo Colors by Matsui in an acrylate. In some embodiments, the adhesive is environmentally friendly and substantially free of formaldehyde. In some embodiments, the adhesive is an acrylate, a cyanoacrylate, or an epoxy.

The release liner may be, for example, a woodfree paper laminated with polyethylene on both sides and silicone coated.

Figure 1A:
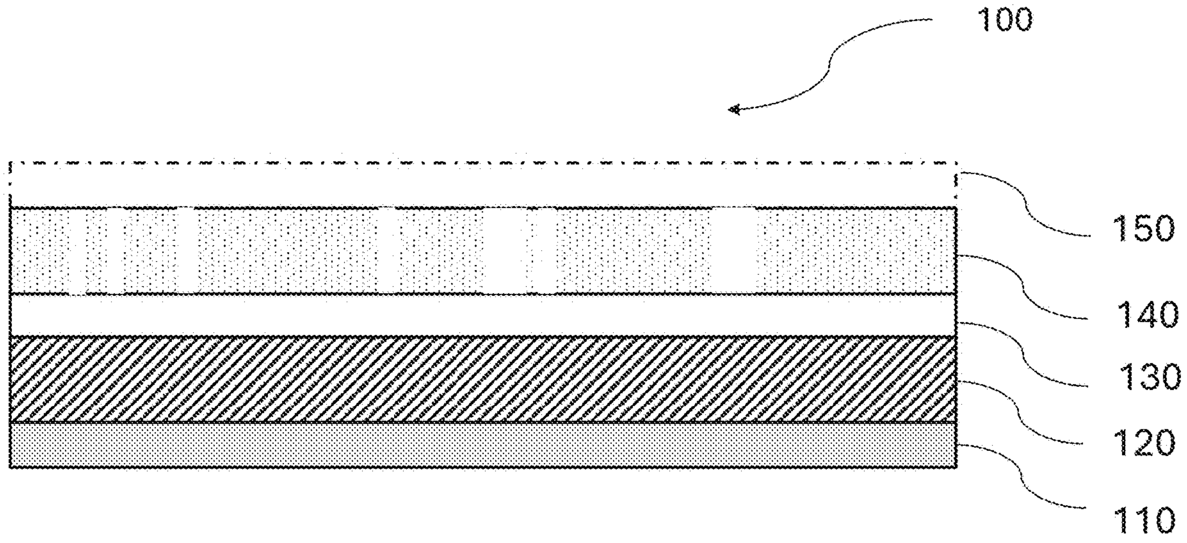
FIG. 1A illustrates a printed thermal media for the embodiment of FIG. 1.

FIG. 1 illustrates a cross-section of a thermally printable media 100 according to a first embodiment. A substrate 130 is transparent or translucent. The substrate is, in some embodiments, a polymeric film comprising polyethylene terephthalate (PET), biaxially oriented polypropylene (BOPP), cast polypropylene (CPP), polyethylene (PE), polypropylene (PP), ethylene vinyl acetate (EVA) or ethylene vinyl alcohol (EVOH), or any combination thereof. In some embodiments, the substrate 130 is a polymer film comprising PET or BOPP. A heat-sensitive layer 140 is disposed on a first surface of the substrate 130. The heat-sensitive layer 140 may cover the entirety of the first surface of the substrate 130, or may cover about 80% to about 100% of the first surface of the substrate 130. The heat-sensitive layer may comprise an SCC polymer as described above such as an alkyl acrylate having $C_{16}$ to $C_{30}$ alkyl sidechains. A pigment is mixed into an adhesive. And the pigmented adhesive 120 is disposed on a second surface of the substrate 130, opposite the first surface. The pigment may be a water-based pigment that is free of bis-phenols as described above and may be mixed into, for instance, into a pressure sensitive adhesive such as an acrylate. If the heat sensitive layer, in its initial state, is opaque and light colored (or has a light colored appearance because of light scattering), the pigment is dark, and preferably black. After direct thermal imaging, portions of the heat-sensitive layer are rendered transparent as shown in FIG. 1A, thereby revealing the pigmented adhesive's color, i.e., the printed image. The pigmented adhesive 120 may cover the entirety of the second surface of the substrate 130, or may cover about 80% to about 100% of the second surface of the substrate 130. Patterned adhesive placement or partial coverage is possible, but only with a concomitant reduction in the expected printable area of the media—the media is not printable with the process described in this disclosure in the example described in this section in areas of the substrate where there is no pigmented adhesive applied. A removable release liner 110 is placed in contact with the pigmented adhesive 120. The heat-sensitive polymer layer 140 is optionally overlaid with a varnish 150, as shown by the dotted line. When the heat-sensitive layer 140 is overlaid with a varnish layer 150, the varnish layer 150 remains clear while the heat-sensitive layer 140 is initially opaque and becomes translucent or transparent in the imaged areas after direct thermal printing.

The substrate 130 can be overlaid with the heat-sensitive layer using a flood coating process, or in alternative embodiments, by spray coating, or by flexo coating. The pigmented adhesive 120 can be transfer coated on the substrate 130 using gravure, slot-die or roll coaters.

In an alternative design of the first embodiment illustrated by FIG. 1, rather than incorporating the color in the adhesive, a pigmented color layer may be provided on the second surface of the substrate, between the substrate and the adhesive layer.

FIG. 1A illustrates a cross-section of a thermal-printed media for the embodiment of FIG. 1 where the imaged areas in the heat-sensitive layer are rendered transparent or translucent.

Figure 2:
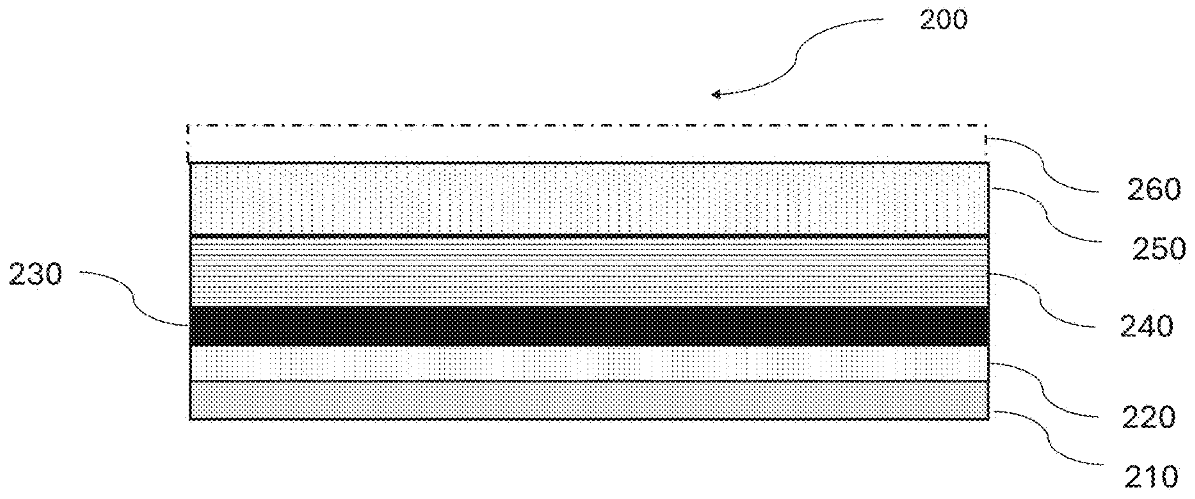
FIG. 2 illustrates a second configuration of a thermal printable media according to embodiments of the present disclosure.

FIG. 2 illustrates a cross-section of a thermally printable media 200 according to a second embodiment. A first surface of a substrate 230 is overlaid with a pigment 240 using, for example, gravure, slot-die or roll coaters. The pigment may be a water-based pigment that is free of bis-phenols as described above. The substrate comprises a material selected from a group consisting of: paper, paperboard, cardboard, cotton, linen, jute, ramie, industrial hemp or rayon, polyamide, polyester, polyacrylate, polyurethanes or vinyl-based fibers, blended fibrous substrates based on cellulosic and non-cellulosic fibers; polymeric resin; and composites of polymeric resins with cellulosic or non-cellulosic fibrous material; and combinations thereof. In a variation of this embodiment, the substrate is paper. Unlike the embodiment of FIG. 1, the substrate 230 need not be transparent or translucent, because the pigmented layer is provided between the heat sensitive layer and the substrate, rather than on the opposite side of the substrate. The pigment layer 240 may cover the entirety of the first surface of the substrate 230, or may cover about 80% to about 100% of the first surface of the substrate 230. The pigment may be a water-based pigment as described herein. A heat-sensitive layer 250 is overlaid on the pigment layer 240 by flood coating or flexo coating the pigment layer 240. The heat-sensitive layer may comprise an SCC polymer as described above such as an alkyl acrylate having $C_{16}$ to $C_{30}$ alkyl sidechains. The heat-sensitive layer 250 is optionally overlaid with a varnish 260, as shown by the dotted line. When the heat-sensitive layer 250 is overlaid with a varnish layer 260, the varnish layer 260 remains clear while the heat-sensitive layer 250 is initially opaque and becomes translucent or transparent in the imaged areas after direct thermal printing.

Figure 2A:
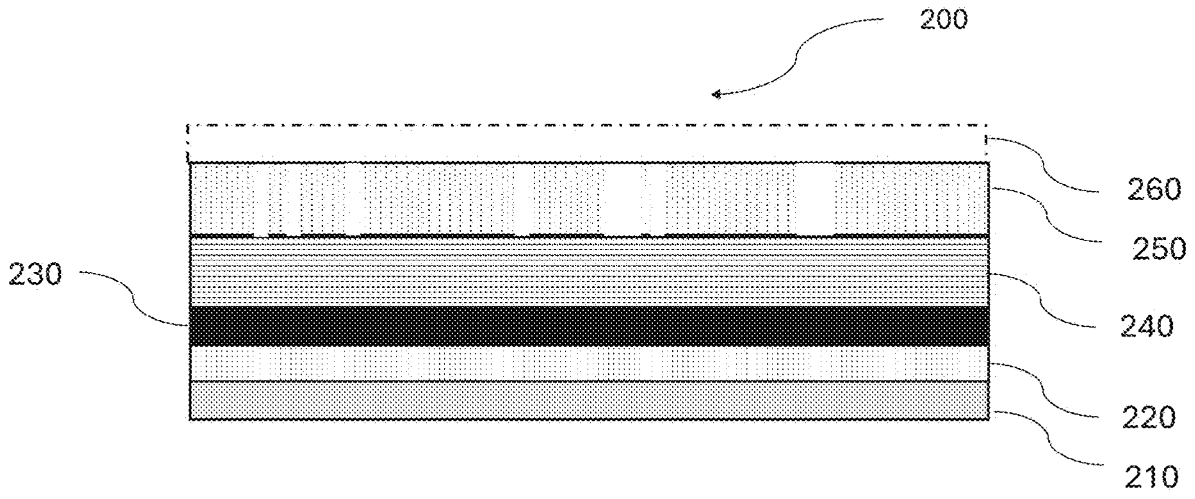
FIG. 2A illustrates a printed thermal media for the embodiment of FIG. 2.

After direct thermal imaging, portions of the heat-sensitive layer are rendered transparent or translucent as shown in FIG. 2A, thereby revealing the pigment's color, i.e., the printed image. A second surface of the substrate 230, opposite the first surface, is coated with an adhesive layer 220 using, for example, gravure, slot-die or roll coaters. The adhesive may comprise, for example, an acrylate or other adhesives described herein. The adhesive layer 220 is in contact with a removable release liner 210.

FIG. 2A illustrates a cross-section of a thermal-printed media for the embodiment of FIG. 2 where the imaged areas are transparent.

Figure 3:
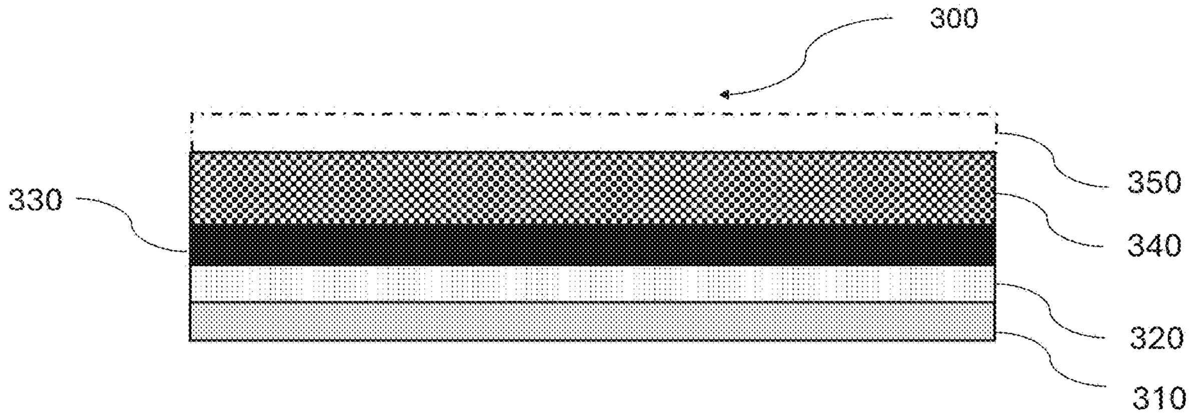
FIG. 3 illustrates a third configuration of a thermal printable media according to embodiments of the present disclosure.
Figure 3A:
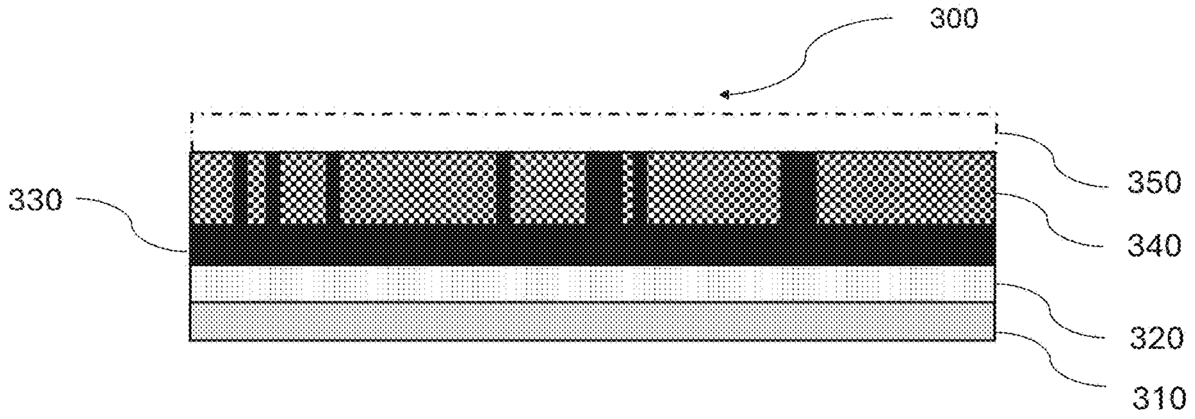
FIG. 3A illustrates a printed thermal media for the embodiment of FIG. 3.

FIG. 3 illustrates a cross-section of a thermally printable media 300 according to a third embodiment. A first surface of a substrate 330 is overlaid with a layer 340 comprising a heat-sensitive polymer mixed with a pigment. The layer 340 is overlaid on a substrate 330 by flood coating or flexo coating the substrate 330. In this embodiment, the layer 340 may be opaque or faintly colored (e.g., a light gray). The heat-sensitive polymer may be an SCC polymer as described above such as an alkyl acrylate having $C_{16}$ to $C_{30}$ alkyl sidechains. The pigment may be a water-based pigment as described above. After direct thermal imaging, portions of the heat-sensitive layer are rendered transparent as shown in FIG. 3A, thereby revealing the pigment's color, i.e., the printed image. The substrate 330 comprises a material selected from a group consisting of: paper, paperboard, cardboard, cotton, linen, jute, ramie, industrial hemp or rayon, polyamide, polyester, polyacrylate, polyurethanes or vinyl-based fibers, blended fibrous substrates based on cellulosic and non-cellulosic fibers; polymeric resin; and composites of polymeric resins with cellulosic or non-cellulosic fibrous material; and combinations thereof. In a variation of this embodiment, the substrate is paper. In the third embodiment, the substrate 330 may have an initial color, preferably dark or black, which may be the inherent color of the material, or which might be obtained by dying or otherwise including a pigment in the substrate. Or the substrate may have an initial neutral color. The layer 340 may cover the entirety of the first surface of the substrate 330, or may cover about 80% to about 100% of the first surface of the substrate 330. The layer 340 is optionally overlaid with a varnish layer 350, as shown by the dotted line. When the layer 340 is overlaid with a varnish layer 350, the varnish layer 150 remains clear while the layer 340 is initially opaque and becomes translucent or transparent in the imaged areas after direct thermal printing.

A second surface of the substrate 330, opposite the first surface, is coated with an adhesive layer 320. The adhesive layer 320 is in contact with a removable release liner 310.

FIG. 3A illustrates a cross-section of a thermal-printed media for the embodiment of FIG. 3 where the imaged areas are colored.

Figure 4:
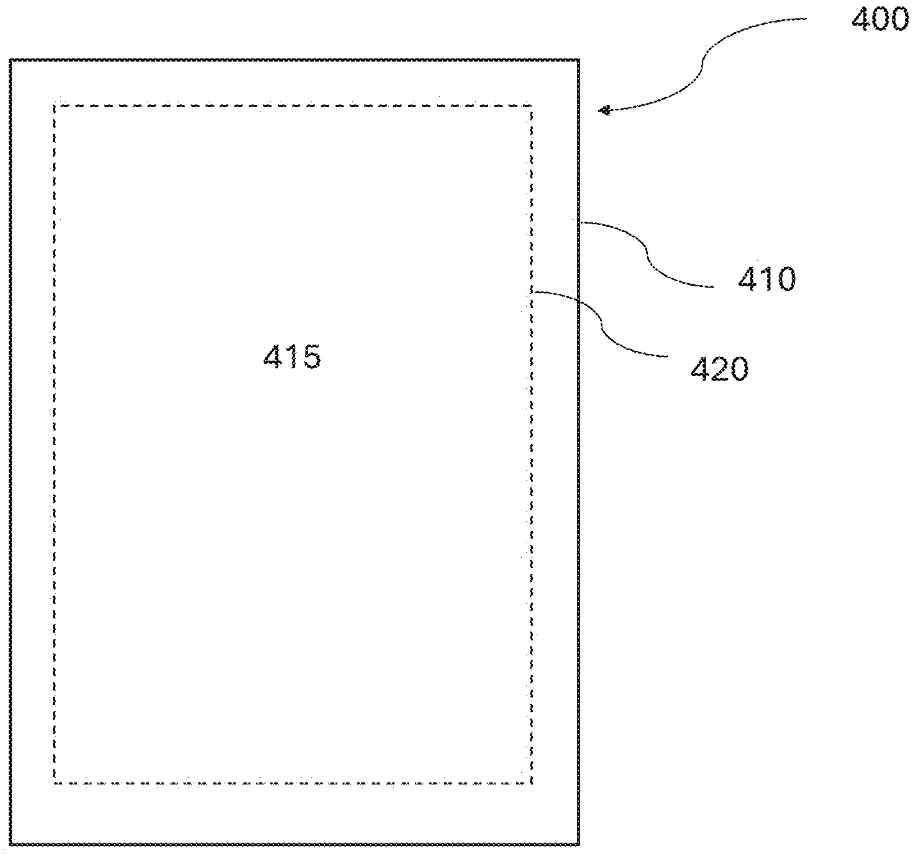
FIG. 4 illustrates a thermal printable media, configured as a sheet, according to embodiments of the present disclosure.

FIG. 4 illustrates a top view of sheet 400 of thermally printable material of any of the embodiments described in FIG. 1, FIG. 1A, FIG. 2, FIG. 2A, FIG. 3, or FIG. 3A, including a substrate 410 and a heat-sensitive layer 415 disposed in a printable region 420. The thermally printable sheet 400 may have a dimensional ratios consistent with a letter size sheet; however the present disclosure contemplates embodiments in which the thermal printable media includes any side length ratio. Further contemplated by the present disclosure are embodiments in which the heat-sensitive layer 415 of the sheet 400 occupies the entirety of the surface of substrate 410, asymmetric portions of substrate 410, and/or any configurations of non-printable margins on sheet 400. In alternative embodiments, substrate 410 has a layer 415 overlaid on it where the layer 415 also comprises a pigment. In further alternative embodiments, substrate 410 has a pigment layer thereon, which is overlaid with a heat-sensitive layer 415. In various embodiments, the heat-sensitive layer 415 is overlaid with an optional varnish.

Figure 5:
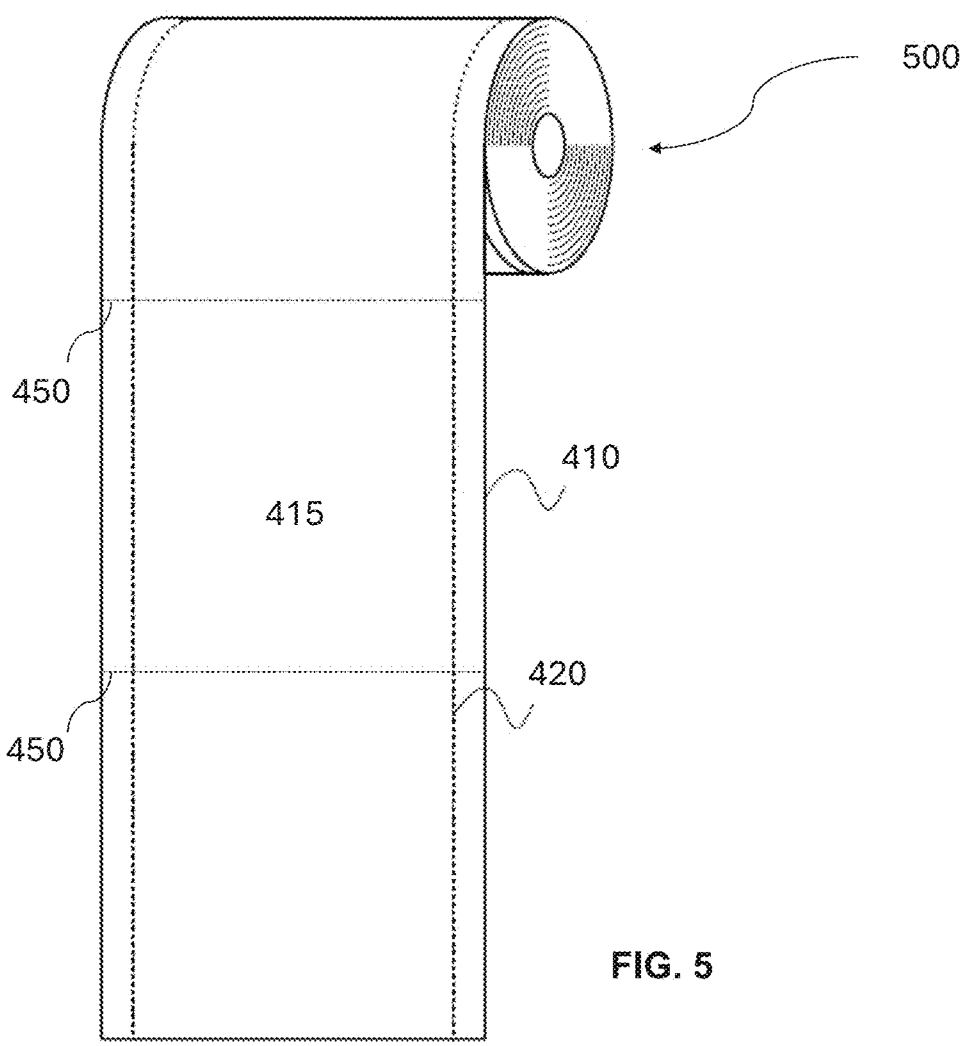
FIG. 5 illustrates a thermal printable media, configured as a roll, according to embodiments of the present disclosure.

FIG. 5 illustrates a roll 500 of thermally printable material of any of the embodiments described in FIG. 1, 2, or 3, including a substrate 410 and a heat-sensitive layer in a printable region 420. The roll 500 is configured as a continuous strip of substrate 410 wound about a spool. According to some embodiments, the roll 500 of thermally printable material is suited for applications with thermal roll printers, for printing media such as receipts, tickets, and other forms of media of constant width and variable length. Although illustrated as having non-printable margins, this disclosure contemplates embodiments where the printable region 420 extends to the edge of the substrate 410. Optionally, the roll 500 may include lines of weakness 450, between the labels, if the labels are intended to be torn or burst a apart. These may be applied by different processes, e.g., partial cutting using a laser, punching, folding, embossing, or other processes. If the roll is intended to be used in a printer with a cutter, this feature may be included (if registration between the cuts and lines of weakness is maintained), or omitted.

Figure 6:
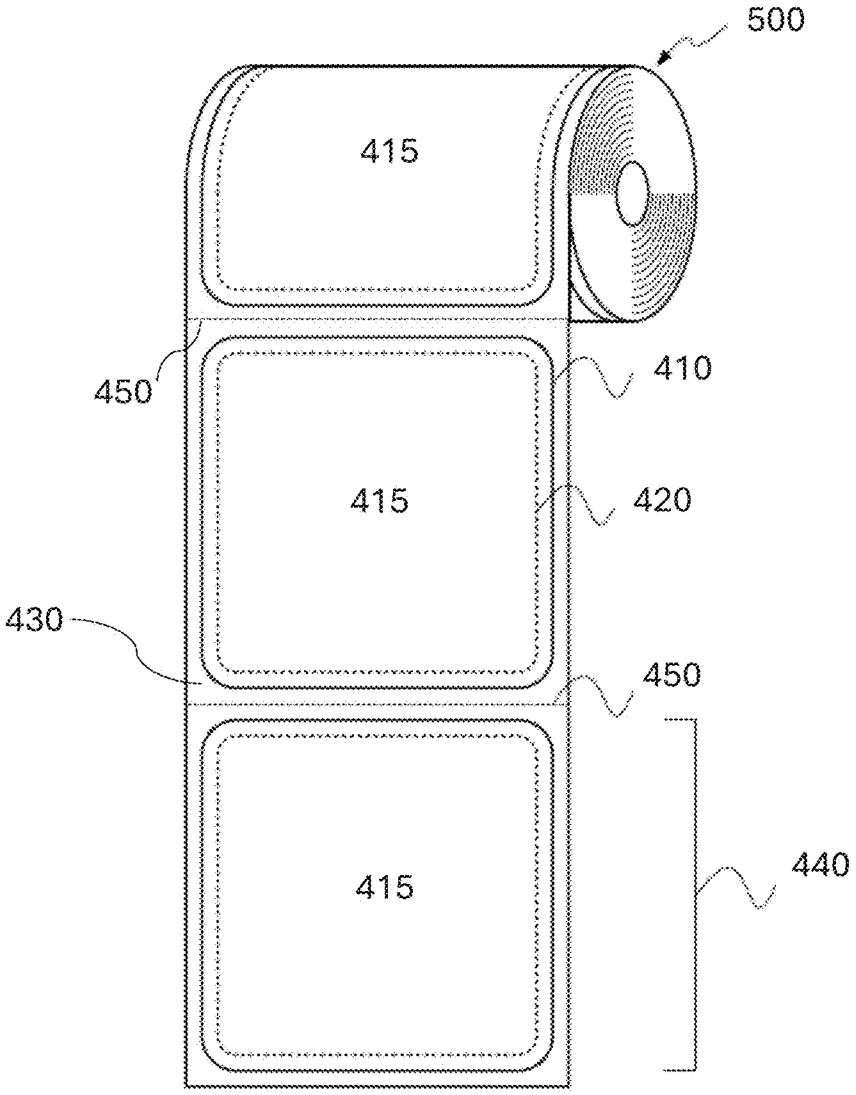
FIG. 6 illustrates a thermal printable media, configured as a roll of a web of thermally printable adhesive labels, according to embodiments of the present disclosure.

FIG. 6 illustrates a roll 500 of thermally printable labels 440 of any of the embodiments described in FIG. 1, 2, or 3, including a substrate 410, a heat-sensitive layer 415 disposed in printable regions 420, and a liner 430. The roll 500 of thermally printable labels 440 is configured as a web of labels 440, temporarily adhered to a liner 430, which, in some examples, includes a release surface such that the labels 440 may be readily removed for application to a host product. The labels 440 include an adhesive backing on the surface of the substrate 410 opposite the printable region 420, by which the labels are temporarily adhered to the liner, and then to the host product. Although illustrated as having non-printable margins, this disclosure contemplates embodiments wherein the printable region 420 of each label 440 extends to the edges of the substrate 410. The roll 500 may include lines of weakness 450, between the labels. Embodiments wherein the web of labels is configured as a fan fold stack are further included in the scope of the instant disclosure.

Thermal print media described herein may have an overall thickness of about 0.05 mm to about 0.3 mm, including the substrate film, adhesive or pigmented adhesive, the removable liner, and the optional varnish layer.

In some embodiments, the heat-sensitive layer has a thickness ranging from about 0.02 mm to about 0.05 mm), the transparent substrate has a thickness ranging from about 0.02 mm to about 0.2 mm, and the pigmented adhesive layer has a thickness ranging from about 0.01 mm to about 0.05 mm. In some embodiments, when a pigmented adhesive is used, such as in the first embodiment of FIG. 1 and FIG. 1A, to ensure uniform color and adhesion, the percent by weight of the pigment in the pigmented adhesive ranges from about 1% to about 25%. The thickness of the pigmented adhesive layer ranges from about 0.01 mm to about 0.02 mm.

In some embodiments, the heat-sensitive layer has a thickness ranging from about 0.02 mm to about 0.05 mm, the pigment layer on the substrate has a thickness of less than about 0.01 mm, the substrate has a thickness of about 0.02 mm to about 0.2 mm, and the adhesive has a thickness of about 0.01 mm to about 0.05 mm. In some embodiments, such as in the second embodiment of FIG. 2 and FIG. 2A, the pigment layer on the substrate should be thinner than the heat-sensitive layer to ensure suitable opacity. In some of these embodiments, the ratio of the thickness of the pigment layer to the thickness of the heat-sensitive layer is about 1:10.

In some embodiments, the substrate in the thermal print media described herein has a thickness which is suitable for supporting the other layers but is thin enough for pliability of the thermal print media. In some embodiments, the substrate has a thickness which is not less than about 0.02 mm. In some embodiments, the substrate has a thickness ranging from about 0.02 mm to about 0.2 mm.

In some embodiments, the heat-sensitive layer should not be so thick that it impacts the melting of the heat-sensitive polymer during direct thermal printing and negatively affects the print quality. For instance, image print quality may degrade if the heat-sensitive layer's thickness exceeds 0.05 mm. Accordingly, in some embodiments, the heat-sensitive layer has a thickness ranging from about 0.02 mm to about 0.05 mm.

FIG. 7, FIG. 8, FIG. 9, FIG. 10 and FIG. 11 illustrate experimental results, discussion of which may be found in the Examples section below.

EXAMPLES

A Zebra ZT610 printer was used, Direct Thermal print mode, 2ips (range 2-14ips), resolution 203 dpi, darkness ranging from 15 to 30, with print head heating element temperatures ranging from about 50° C. to about 300° C., or from about 180° C. to about 200° C.

Example 1

An SCC polymer emulsion comprising $C_{16}$ and $C_{18}$ acrylates, about 50% by weight, was blended into Ottopol® 25-30 acrylic resin (30% in water) to obtain a mixture which was overlaid on a substrate (a commercially available transparent PET film). The opposite surface of the substrate was coated with a pressure sensitive acrylic adhesive, i.e., a black acrylic adhesive tape which contacted a silicone coated paper release liner (PT25 NB by Lintec).

To achieve suitable opacity of the SCC coating layer, the ratio of SCC polymer emulsion to acrylic binder resin (P/B) was varied. The weight percentage of the SCC polymer in the mixture ranged from about 24% to about 44% in this experiment.

FIG. 7 show results from the experiment. Opacity was measured as optical density (OD) Cyan values. A P/B ratio of about 2.5 to about 10 provided a higher opacity (less black color visible).

Figure 8:
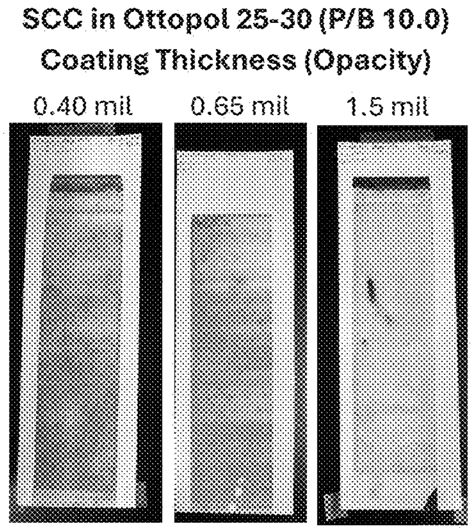
FIG. 8 illustrates results from Example 1, according to embodiments of the present disclosure.

The thickness of the heat-sensitive SCC layer was varied. FIG. 8 shows results from flood coating a SCC binder mixture having a P/B ratio of 10.0 with different thicknesses, 0.4 mil (or 0.01 mm), 0.65 mil (or 0.017 mm), or 1.5 mil (or 0.038 mm). A higher thickness increased opacity (less black color visible) as shown by the images in FIG. 8.

Additionally, a varnish may be overlaid on the heat-sensitive SCC layer to protect the heat-sensitive SCC layer, to reduce flakiness, and to ensure the coating remains intact during direct thermal printing.

Example 2

A pigmented water-based dispersion (e.g., NeoColors by Matsui) is mixed in a certain ratio (e.g., about 1% to about 25% of pigment by weight) into a water-based pressure sensitive adhesive (e.g., Covinax 289-01 DEV). The pigmented adhesive is transfer coated using gravure, slot-die and/or roll coaters onto a release liner. A transparent film is overlaid on the pigmented adhesive so that a first surface of the transparent film is in contact with the pigmented adhesive.

A thin layer of SCC polymer emulsion comprising $C_{16}$ and Cis acrylates, about 50% by weight ($T_m$ about 48-49° C.), is mixed into a binder solution of Ottopol® 25-30 acrylic binder resin 30% by weight in water. The number average molecular weight for the emulsion polymers falls in the range of about 80,000 daltons to about 100,000 daltons. The mixture of the SCC polymer and binder is flood coated on the opposite surface of the transparent film The ratio of SCC polymer emulsion to acrylic binder resin and the thickness of the flood coated layer is adjusted to provide suitable optical transparency to mask the colored background, while retaining the ability to image with a thermal printer.

When direct thermal printed, heat from the thermal printer melts the SCC coating according to the image being printed, making it transparent, revealing the pigmented adhesive's color layer through the transparent film.

Example 3

A pigmented water-based ink (e.g., Matsui NeoColors WB dispersion) is mixed into a 30% by weight solution of Ottopol® 25-30 acrylic binder in water. The pigmented mixture is flexo coated in a thin layer over a base substrate (e.g., Paper (Z-Select 4000T), Polypropylene (PolyPro 4000T), or Polyester (Z-Xtreme 4000T)) to provide a color coated base substrate. Alternatively, a resin (or wax, wax/resin) ribbon with a pigment therein can be pre-printed via thermal transfer onto the base substrate in a solid square.

An SCC polymer emulsion comprising $C_{16}$ and Cis acrylates, about 50% by weight (having a $T_m$ of about 48-49° C.), is added to a 30% by weight solution of Ottopol® 25-30 acrylic resin binder in water. The number average molecular weight for the emulsion polymers falls in the range of about 80,000 daltons to about 100,000 daltons. The mixture of SCC polymer and binder is then flood coated in a thin layer to overlay the color coated base substrate.

The ratio of SCC polymer emulsion to acrylic binder resin and the thickness of the opaque coating is adjusted to provide suitable opacity to mask the colored background, but so that it can be rendered transparent or translucent when imaged with a thermal printer.

When direct thermal printed, heat from the thermal printer melts the SCC coating making it transparent, revealing the color of the coated base substrate.

Example 4

A thin layer of SCC polymer emulsion comprising $C_{16}$ and $C_{18}$ acrylates, about 50% by weight ($T_m$ about 48-49° C.), was mixed into Ottopol® 25-30 acrylic binder resin 30% in water, and flood coated over a single coated Matte Black Tape #67100B-20KT. The number average molecular weight for the emulsion polymers falls in the range of about 80,000 daltons to about 100,000 daltons.

Figure 9:
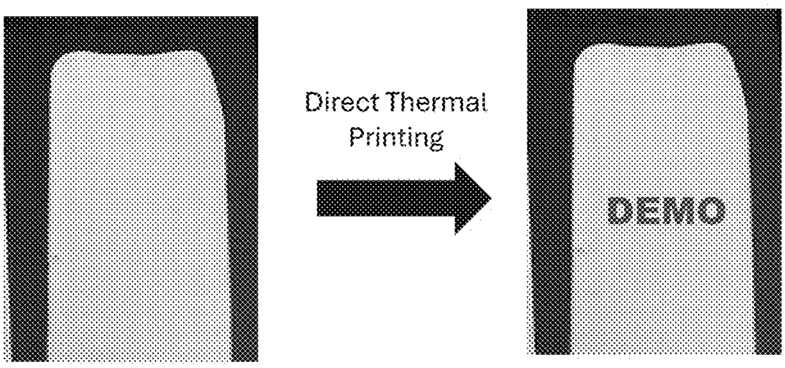
FIG. 9 illustrates results from Example 4, according to embodiments of the present disclosure.

The ratio of SCC polymer emulsion to acrylic binder resin and the thickness of the flood coated layer coating was adjusted to provide suitable opacity (e.g., optical transparency of about 1% to about 10%) to mask the black background, while retaining the ability to image with a thermal printer When direct thermal printed, heat from the thermal printer melts the SCC coating making it transparent, revealing the black layer. FIG. 9 shows the results from this experiment.

FIG. 10 shows results from some additional experiments in which a clear varnish was overlaid on the heat-sensitive layer.

Figure 11:
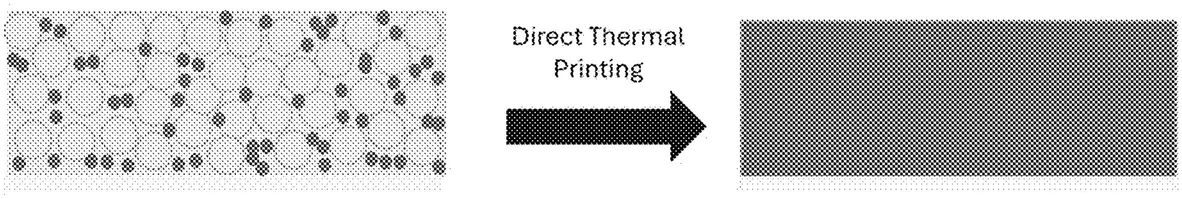
FIG. 11 illustrates results from the embodiment illustrated in FIG. 3.

FIG. 11 shows results from an experiment where a pigment was mixed into the heat-sensitive layer. When direct thermal printed, heat from the thermal printer melts the heat-sensitive polymer making it transparent, revealing the black color of the pigment.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed devices, methods and apparatuses are defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A thermal printable media, comprising:
- a transparent or translucent substrate;
- a heat-sensitive layer on a first surface of the substrate comprising:
  - a heat-sensitive polymer; and
  - a binder adhering the heat-sensitive polymer to the first surface;
- a pigmented adhesive layer on a second surface of the substrate; and
- a removable release liner in contact with the pigmented adhesive layer;
- wherein, in response to heat exposure above a predetermined threshold temperature applied at selected locations on the printable media, the heat-sensitive layer changes irreversibly to transparent or translucent at the selected locations, thereby revealing the pigmented adhesive's color at the selected locations.

2. The thermal print media of claim 1, wherein the second surface is opposite the first surface.

3. The thermal print media of claim 1, wherein the heat-sensitive polymer is selected from a side chain crystalline (SCC) polymer, or a side chain liquid crystal polymer (SCLCP).

4. The thermal print media of claim 1, wherein the heat-sensitive layer changing irreversibly to transparent or translucent at the selected locations is a result of a change in crystallinity of the heat-sensitive polymer.

5. The thermal print media of claim 1, wherein the heat-sensitive layer coats between about 80% to about 100% of the first surface of the substrate.

6. The thermal printable media of claim 1, wherein the heat-sensitive layer has an optical transparency, prior to the heat exposure, sufficient to mask the pigmented adhesive.

7. The thermal print media of claim 6, wherein the heat-sensitive layer has an optical transparency of about 2% to about 5% prior to the heat exposure, and an optical transparency of about 90% to about 95% after the heat exposure.

8. The thermal print media of claim 1, wherein the pigmented adhesive coats between about 80% to about 100% of the second surface of the substrate.

9. The thermal printable media of claim 1, wherein the pigmented adhesive comprises a water-based ink.

10. The thermal print media of claim 1, wherein the pigmented adhesive comprises carbon black in an amount sufficient to allow a dark color to be visible at the selected locations through the transparent or translucent substrate and the heat-sensitive layer after the heat-sensitive layer changes to transparent or translucent at the selected locations.

11. The thermal print media of claim 1, wherein the pigmented adhesive comprises about 1% to about 25% of pigment by weight.

12. The thermal printable media of claim 1, wherein the transparent or translucent substrate comprises polyethylene terephthalate (PET), biaxially oriented polypropylene (BOPP), cast polypropylene (CPP), polyethylene (PE), polypropylene (PP), ethylene vinyl acetate (EVA) or ethylene vinyl alcohol (EVOH), or a combination thereof.

13. The thermal printable media of claim 1, wherein the transparent or translucent substrate is a polymer film.

14. The thermal print media of claim 1, wherein the heat-sensitive polymer is an SCC polymer.

15. The thermal print media of claim 1, wherein the SCC polymer has a melting temperature ($T_m$) ranging from about 40° C. to about 300° C.

16. The thermal print media of claim 1, wherein the SCC polymer has a melting temperature ($T_m$) ranging from about 40° C. to about 100° C.

17. The thermal print media of claim 1, wherein the SCC polymer is about 20% to about 50% weight by weight (w/w) of the coat on the substrate.

18. The thermal print media of claim 1, wherein the SCC polymer and the binder are mixed in water in a ratio ranging from about 10:1 to about 1:10 and coated on the substrate.

19. The thermal print media of claim 1, wherein the SCC polymer is an acrylate.

20. The thermal print media of claim 1, wherein the SCC polymer is a polyalkyl acrylate comprising a plurality of $C_{16}$-$C_{30}$ alkyl sidechains.

21. The thermal printable media of claim 1, wherein the SCC polymer has a number average molecular weight of about 60,000 daltons to about 120,000 daltons.

22. The thermal printable media of claim 1, wherein the binder comprises an anionic acrylate.

23. The thermal printable media of claim 1, wherein the binder comprises a hydroxyalkyl acrylate.

24. The thermal printable media of claim 1, further comprising a varnish overcoat overlaid on the heat-sensitive layer.

25. The thermal printable media of claim 24, wherein the varnish overcoat comprises a water based acrylic emulsion.

26. The thermal printable media of claim 1, wherein the thermal printed media durably retains its color for a period of at least 1 year when subjected to light and/or temperatures ranging from −15° C. to 45° C.

27. A method for preparing the thermal print media of claim 1, the method comprising:

receiving a substrate;

coating a heat-sensitive layer comprising a heat-sensitive polymer and a binder on between about 80% to about 100% of a first surface of the substrate;

coating a pigmented adhesive on between about 80% to about 100% of a second surface of the substrate, opposite the first surface;

placing a removable releasable liner in contact with the pigmented adhesive; and optionally overlaying a varnish overcoat on the heat-sensitive layer.

28. The method of claim 27, further comprising contacting the printable media with a direct thermal print head to provide a printed media.

29. The method of claim 28, further comprising removing the liner and applying the printed media to a surface.

30. A thermal printable media, comprising:

a substrate;

a pigmented layer on a first surface of the substrate;

a heat-sensitive layer overlaying the pigmented layer comprising:

a heat-sensitive polymer; and a binder adhering the heat-sensitive polymer to the pigmented layer;

an adhesive on a second surface of the substrate, opposite the first surface;

and a removable release liner in contact with the adhesive;

wherein, in response to heat exposure above a predetermined threshold temperature applied at selected locations on the printable media, the heat-sensitive layer changes irreversibly to transparent or translucent at the selected locations, thereby revealing the pigmented layer's color at the selected locations;

wherein the heat-sensitive layer changes irreversibly to transparent or translucent at the selected locations in a temperature range of about 65° C. to about 150° C.;

wherein the heat-sensitive polymer comprises a polyalkyl acrylate prepared from a plurality of monomers having sidechains ranging in length from $C_{16}$ to $C_{30}$;

wherein the heat-sensitive polymer has a number average molecular weight of about 60,000 daltons to about 120,000 daltons; and wherein the heat-sensitive layer coats between about 80% to about 100% of the surface of the pigmented layer.

31. A thermal printable media, comprising:

a substrate;

a heat-sensitive layer overlaying a first surface of the substrate comprising:

a heat-sensitive polymer;

a binder adhering the heat-sensitive polymer to the first surface; and a pigment;

an adhesive layer on a second surface of the substrate, opposite the first surface;

and a release liner in contact the adhesive;

wherein, in response to heat exposure above a predetermined threshold temperature applied at selected locations on the printable media, the heat-sensitive layer changes irreversibly to transparent or translucent at the selected locations, thereby revealing the pigment's color at the selected locations;

wherein the heat-sensitive layer changes irreversibly to transparent or translucent at the selected locations in a temperature range of about 65° C. to about 150° C.;

wherein the heat-sensitive polymer comprises a polyalkyl acrylate prepared from a plurality of monomers having sidechains ranging in length from $C_{16}$ to $C_{30}$;

wherein the heat-sensitive polymer has a number average molecular weight of about 60,000 daltons to about 120,000 daltons; and wherein the heat-sensitive layer coats between about 80% to about 100% of the substrate.

* * * * *